(12) United States Patent
Whitney et al.

(10) Patent No.: US 8,671,056 B1
(45) Date of Patent: Mar. 11, 2014

(54) SOCIAL SOURCED PURCHASING ADVICE SYSTEM

(71) Applicant: MasterCard International Incorporated, Purchase, NY (US)

(72) Inventors: Stephen Whitney, Co. Dublin (IE); Peter J. Groarke, Dublin (IE)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 13/747,253

(22) Filed: Jan. 22, 2013

(51) Int. Cl.
*G06Q 40/00* (2012.01)

(52) U.S. Cl.
USPC .............. 705/44; 707/723; 709/202; 715/205

(58) Field of Classification Search
USPC .................... 709/202; 705/7, 44; 715/205
See application file for complete search history.

(56) References Cited

U.S. PATENT DOCUMENTS

| | | | | |
|---|---|---|---|---|
| 8,050,191 | B2* | 11/2011 | Tirpak et al. ................ | 370/252 |
| 8,255,380 | B2* | 8/2012 | Christensen et al. ......... | 707/706 |
| 8,539,018 | B2* | 9/2013 | Bisdikian et al. ............ | 709/200 |
| 2002/0087600 | A1* | 7/2002 | Newbold ...................... | 707/514 |
| 2003/0135818 | A1* | 7/2003 | Goodwin et al. ............. | 715/500 |
| 2005/0192957 | A1* | 9/2005 | Newbold ........................... | 707/5 |
| 2008/0004944 | A1* | 1/2008 | Calabria ......................... | 705/10 |
| 2008/0243637 | A1* | 10/2008 | Chan et al. ..................... | 705/27 |
| 2009/0043596 | A1* | 2/2009 | Pierce .............................. | 705/1 |
| 2009/0076923 | A1* | 3/2009 | Warhover et al. ............... | 705/21 |
| 2009/0222329 | A1* | 9/2009 | Ramer et al. .................... | 705/10 |
| 2009/0234711 | A1* | 9/2009 | Ramer et al. .................... | 705/10 |
| 2009/0282047 | A1* | 11/2009 | Lin et al. ......................... | 707/10 |
| 2010/0070554 | A1* | 3/2010 | Richardson et al. .......... | 709/202 |
| 2011/0153597 | A1* | 6/2011 | Christensen et al. ......... | 707/723 |
| 2011/0161129 | A1* | 6/2011 | Barsoba et al. ............. | 705/7.14 |
| 2012/0046992 | A1* | 2/2012 | Hu et al. ...................... | 705/7.29 |
| 2012/0116838 | A1* | 5/2012 | Bisdikian et al. ............ | 705/7.28 |
| 2012/0173720 | A1* | 7/2012 | Lin et al. ....................... | 709/224 |
| 2012/0323656 | A1* | 12/2012 | Leach ........................ | 705/14.17 |
| 2013/0018967 | A1* | 1/2013 | Gannu et al. .................. | 709/206 |

OTHER PUBLICATIONS

Searching for Experts in the Enterprise: Combining Text and Social Network Analysis Ehrlich et al, 2007 (group2007-Ehrlich).*

* cited by examiner

*Primary Examiner* — Chika Ojiaku
(74) *Attorney, Agent, or Firm* — Leason Ellis LLP

(57) ABSTRACT

Facilitating the solicitation of expert advice from trusted reviewers using a system that maintains a registry of product reviewers with areas of expertise. The system can identify reviewers that have an area of expertise relating to a consumer's purchase advice request (PAR) and are directly or indirectly connected to the consumer's social network. The system can calculate the trust level of the reviewers based on the relevance of each reviewer's area of expertise to the PAR and the degree of social separation between each reviewer and the consumer. The system provides the consumer with a ranked list of reviewers to answer the PAR and can forward the PAR to the reviewer selected by the consumer. In addition, the system can also complete the purchase of product/service recommended by the reviewer pursuant to the PAR on behalf of the consumer.

24 Claims, 4 Drawing Sheets

SOCIAL SOURCED PURCHASING ADVICE SYSTEM

TECHNICAL FIELD OF THE INVENTION

This patent application relates generally to the field of recommendation systems and, in particular, a system to facilitate the solicitation of purchasing advice from a trusted expert.

BACKGROUND OF THE INVENTION

When making a purchasing decision a consumer may perform research into the products/services they are purchasing to evaluate many aspects of the purchase. For example, quality, longevity, pricing, return on investment and the suitability of a product/service for a specific purpose. This often requires the consumer to learn about the purchase and associated discourses through literature reviews, price comparison and product reviews—all of which can have varying degrees of relevance to any particular consumer. This process can require an amount of effort, learning and understanding that is not unsubstantial.

In order to make sound purchasing decisions, advice is often sought from an expert reviewer in the field. Existing methods for soliciting this advice leave areas to be desired.

Some consumers may have a friend/relative/acquaintance who is an expert reviewer in the field they are purchasing in and may have the opportunity to approach them for information and advice. However, this may not be the case for many. It may also not be the case that there is an expert reviewer in each required purchasing field within the consumer's immediate social network. There may also be a perceived and/or real burden associated with soliciting this advice as the topic can be complex, for example, giving prudent advice may require additional research on behalf of the advisor.

Personal shopping services exist where expert reviewers in particular fields charge consumers to perform market research on their behalf on the premise that the expert reviewer is more adept at traversing the information available. The expert reviewer will return the consumer with a number of options for purchase.

In most cases the expert reviewer is outside of the social network of the consumer and the level of trust bestowed by the consumer in this expert reviewer is limited as his or her credentials are not known personally to the consumer. Also, the expert reviewer has no vested interest in the success of the consumer's purchase and, should this expert reviewer advice be given via electronic communication, the potential for fraud is high.

In addition, these services can be expensive and are typically offered by merchants that are also selling the products being recommended for purchase. If this is not the case, if an expert reviewer recommends a product that the consumer purchases from a merchant and that product is not suitable, the consumer has no recourse to return the product to the merchant, and might then have to seek a refund from the expert reviewer—whose fees would typically dwarf the purchase made.

Should the advice be given by the merchant stocking the product, then consumer has recourse to return the product, but the advice of the merchant is subject to bias—to recommend the products the merchant stocks and to recommend the products on which the merchant makes the highest profit margin.

What is desired is a system that helps a purchaser identify and solicit purchasing advice from qualified individuals that the user can trust. It would also be desirable to have a system in that can facilitate the purchasing transaction It is with respect to these and other considerations that the disclosure made herein is presented.

SUMMARY OF THE INVENTION

Technologies are presented herein in support of a system and method to facilitate and process transactions based on advice from a trusted expert.

According to a first aspect, a computer implemented method for providing consumers with expert advice is provided. The advice is in an area of expertise and is from a reviewer having a direct or indirect social connection with the consumers, as identified from a social network. The method comprises the steps of receiving a purchase advice request (PAR) from a particular consumer over a computer network in which the PAR relates to the area of expertise. The method further comprises mapping the area of expertise to which the PAR relates to a database of reviewers using a processor configured by code executing therein in order to identify a relevant set of reviewers. The relevant set of reviewers is determined from a transaction history concerning each reviewer and the transaction history includes prior purchases that are associated with one or more areas of expertise. A proximity is identified of one or more of the reviewers in at least the relevant set to the particular consumer within the social network using the configured processor. A trust level is calculated using the processor for the reviewers by using the identified proximity. The PAR is then forwarded to a particular reviewer among the reviewers in accordance with the calculated trust level so that the particular consumer can obtain expert advice from a trusted reviewer within the social network of the particular consumer.

The method can also include receiving a purchase recommendation from the particular reviewer, receiving a transaction authorization from the consumer; and completing the transaction.

According to another aspect, a computer implemented method for providing consumers with expert advice is provided. The method comprises the steps of receiving from one or more reviewers using a computing device account information, and storing this information in a database. The account information can include information relating to each reviewer's social network and a transaction history of prior purchases that relate to an area of expertise. The method further comprises, for each of the one or more reviewers, retrieving and analyzing the transaction history to identify one or more areas of expertise. The method further comprises receiving a purchase advice request (PAR) from a particular consumer over a computer network in which the PAR includes social network information for the particular consumer and prospective purchase details relating to an area of expertise. The method further comprises mapping the area of expertise to which the PAR relates to the database of reviewers in order to identify a relevant set of reviewers with expertise relating to the PAR. The method further comprises identifying the particular consumer's social network. A proximity is identified of one or more of the reviewers in at least the relevant set to the particular consumer within the social network using the configured processor. The reviewers in at least the relevant set are ranked by a relevance factor, wherein the relevance factor is computed by comparing the area of expertise in the PAR to the area of expertise for each of the one or more reviewers in at least the relevant set. A trust level is calculated for each of the one or more reviewers in at least the relevant set by using the identified proximity to the particular consumer and the relevance factor. The particular consumer is then provided a ranking of the one or more reviewers in at least the relevant set based on the trust level.

The method can also include receiving a selection from the particular consumer of a particular reviewer. The method can also include receiving a purchase recommendation from the particular reviewer, receiving a transaction authorization from the particular consumer and completing the transaction.

According to another aspect, a system is provided for facilitating the solicitation of purchasing advice. The system having one or more processors configured to interact with a computer-readable storage medium and execute one or more software modules stored on the storage medium. The software modules include a database module that configures the processor to receive social network information and transaction history information from one or more reviewers and store the information in a database. The software modules also include a reviewer analysis module that configures the processor to retrieve and analyze a transaction history for each of at least a subset of the one or more reviewers in order to determine the reviewer's area of expertise. The reviewer analysis module also configures the processor to identify the social network for each of at least a subset of the one or more reviewers. The software modules also include a consumer request module that configures the processor to receive a purchase advice request (PAR) from a particular consumer. The PAR includes social network information specific to the particular consumer and an area of expertise to which the PAR relates. The request processing module configures the processor to identify a set of reviewers that are relevant to the consumer's PAR by mapping the area of expertise to which the PAR relates to the area of expertise of the one or more reviewers. Request processing module also configures the processor to identify a proximity of one or more of the reviewers in at least the relevant set to the particular consumer. Furthermore, request processing module configures the processor to calculate the trust level for the one or more reviewers in at least the relevant set according to the identified proximity. The software modules also include a reporting module that configures the processor to provide the consumer with a ranking of the one or more reviewers in at least the relevant set based on the respective reviewer's trust level. The software modules also include an advice solicitation module that configures the processor to receive a selection from the consumer of a particular reviewer and transmit the PAR to the particular reviewer. Software modules can also include a transaction processing module that configures the processor to receive a purchase recommendation from the particular reviewer and receive a transaction authorization and complete the transaction.

These and other aspects, features, and advantages can be appreciated from the accompanying description of certain embodiments of the invention and the accompanying drawing figures and claims.

DETAILED DESCRIPTION OF CERTAIN EMBODIMENTS OF THE INVENTION

Figure 1:
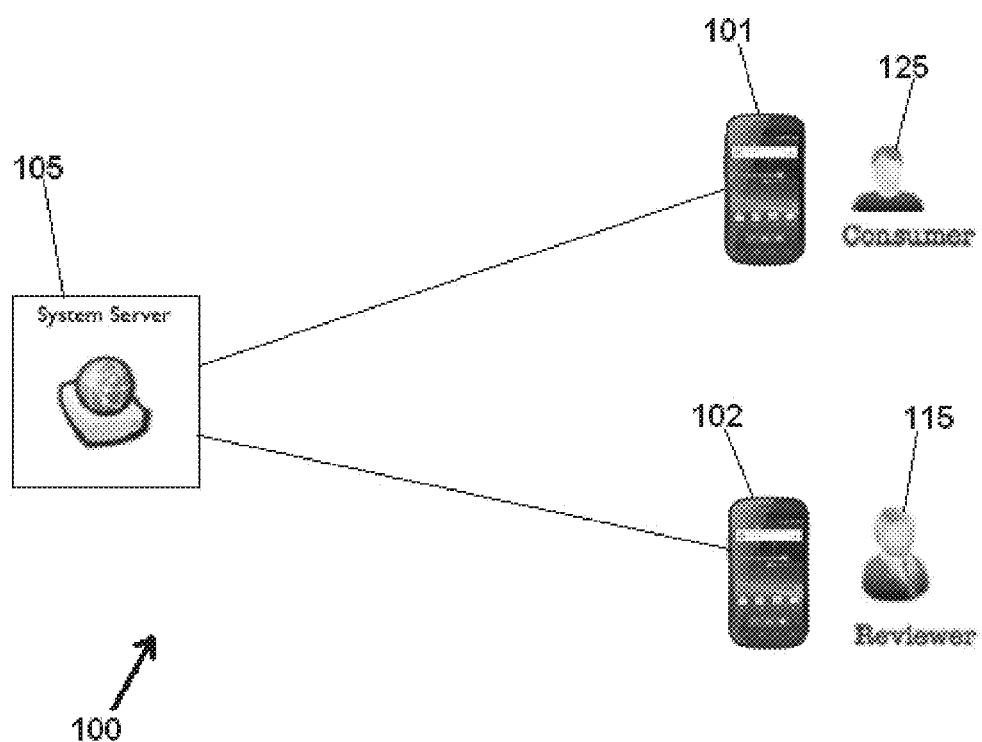
FIG. 1 is a high-level diagram illustrating an exemplary configuration of a purchasing advice solicitation system.

By way of overview and introduction, various systems and methods are described herein that facilitate and enable the solicitation of expert advice from trusted reviewer. The system maintains a registry of product reviewers and for each of the registered reviewers, the system can identify the reviewer's area(s) of expertise by analyzing the reviewer's purchase history and can also identify the reviewer's social network. A consumer needing advice on a prospective purchase can submit to the system a purchase advice request (PAR) for a particular type of product or service (e.g., cameras or car repair services) relating to an area of expertise. Based on the PAR and the consumer's social network information, the system identifies reviewers that have an area of expertise relating to the PAR (e.g., photography or auto repair) and who are also directly or indirectly connected to the consumer's social network. The system also determines the trust level of the reviewers based on the relevance of each reviewer's area of expertise and the degree of social separation between each reviewer and the consumer. The system provides the consumer with a ranked list of reviewers to choose from and forwards the PAR to the reviewer chosen by the user. In addition, the system can also complete the purchase of product/service recommended by the reviewer pursuant to the PAR on behalf of the consumer.

The following detailed description is directed to systems and methods for facilitating the solicitation of purchasing advice from a trusted reviewer. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

An exemplary system is shown as a block diagram in FIG. 1 which is a high-level diagram illustrating an exemplary configuration of a purchasing advice solicitation system 100. In one arrangement, the system consists of a system server 105 and at least one remote consumer computing device 101 and at least one remote reviewer computing device 102. It should be understood that system server 105 can be practically any computing device and/or data processing apparatus capable of embodying the systems and/or methods described herein.

Consumer device 101 can be configured to collect information related to a purchase advice request (PAR) from a consumer 125, communicate the PAR to the system server 105 and receive information relating to the PAR from the system server. Reviewer device 102 can be configured to collect personal information from a reviewer 115 related to a reviewer's identity, expertise and social network, communicate that information to the system server and receive information from the system server. It should be understood that consumer device and reviewer device can be any computing device and/or data processing apparatus capable of embodying the systems and/or methods described herein, including, but not limited to, a personal computer, tablet computer or smart phone device. Neither the consumer device 101 nor the reviewer device 102 form part of the present invention; they communicate with the system server 105 as described more fully below.

Figure 2:
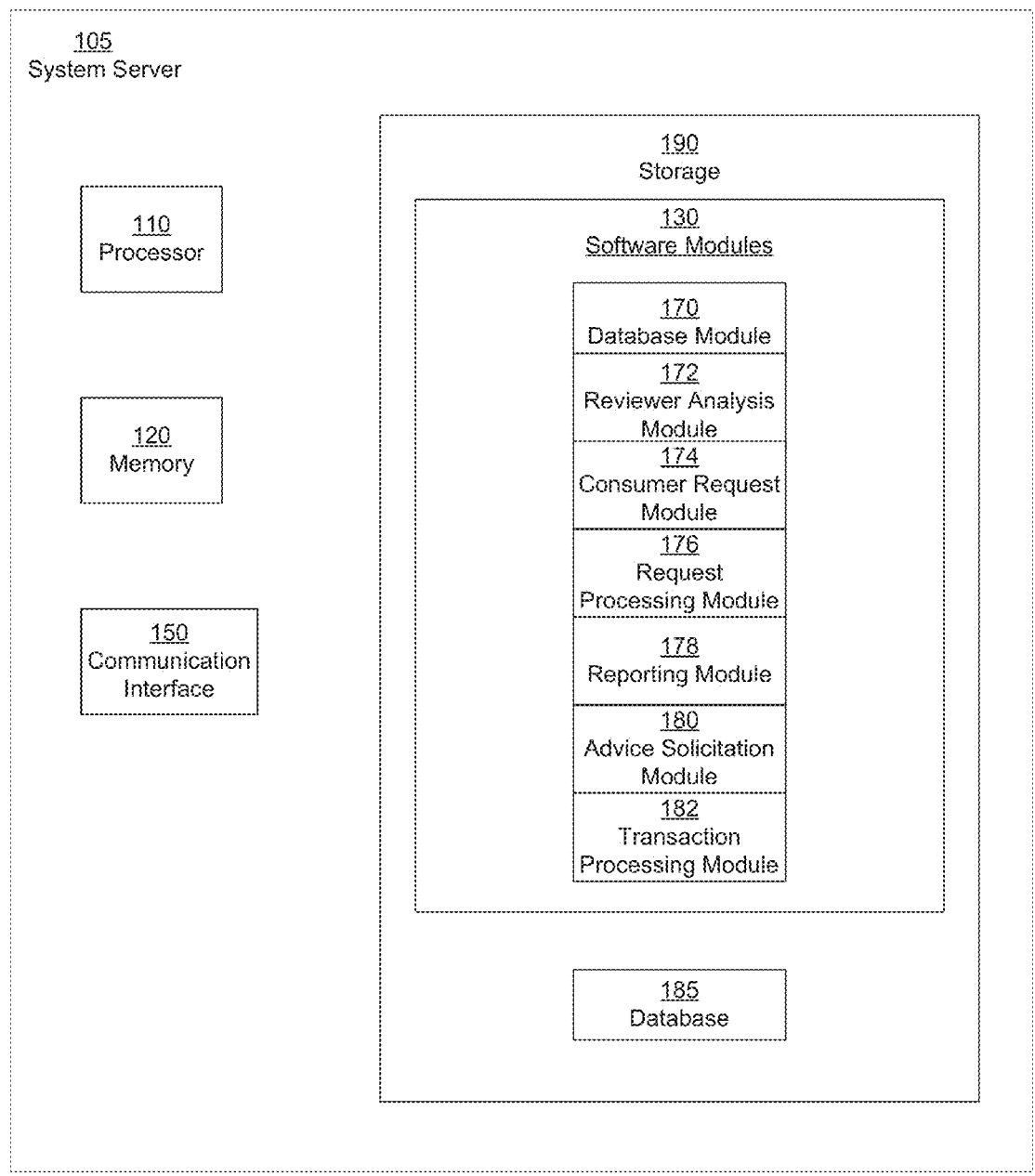
FIG. 2 is a block diagram illustrating an exemplary configuration of a purchasing advice solicitation system.

In reference to FIG. 2, system server 105 of purchasing advice solicitation system 100 includes various hardware and software components that serve to enable operation of the system, including a processor 110, memory 120, storage 190 and a communication interface 150. Processor 110 serves to execute software instructions that can be loaded into memory 120. Processor 110 can be a number of processors, a multiprocessor core, or some other type of processor, depending on the particular implementation.

Preferably, memory 120 and/or storage 190 are accessible by processor 110, thereby enabling processor 110 to receive and execute instructions stored on memory 120 and/or on storage 190. Memory 120 can be, for example, a random access memory (RAM) or any other suitable volatile or non-volatile computer readable storage medium. In addition, memory 120 can be fixed or removable. Storage 190 can take various forms, depending on the particular implementation. For example, storage 190 can contain one or more components or devices such as a hard drive, a flash memory, a rewritable optical disk, a rewritable magnetic tape, or some combination of the above. Storage 190 also can be fixed or removable.

One or more software modules 130 are encoded in storage 190 and/or in memory 120. The software modules 130 can comprise one or more software programs or applications having computer program code or a set of instructions executed in processor 110. Such computer program code or instructions for carrying out operations for aspects of the systems and methods disclosed herein can be written in any combination of one or more programming languages. The program code can execute entirely on system server 105, partly on system server 105, as a stand-alone software package, partly on system server 105 and partly on a remote computer/device such as reviewer device 102 and/or consumer device 101, or entirely on the remote computer/device. In the latter scenario, the remote computer can be connected to system server 105 through any type of network, including a local area network (LAN) or a wide area network (WAN), or the connection can be made to an external computer (for example, through the Internet using an Internet Service Provider).

Preferably, included among the software modules 130 is a database module 170, a reviewer analysis module 172, a consumer request module 174, a request processing module 176 and a reporting module 178, advice solicitation module 180 and transaction processing module 182 that are executed by processor 110. During execution of the software modules 130, the processor 110 configures the system server 105 to perform various operations relating to the facilitating and processing of payment transactions, as will be described in greater detail below.

It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It should be understood that in some illustrative embodiments, one or more of software modules 130 can be downloaded over a network to storage 190 from another device or system via communication interface 150 for use within the purchasing advice solicitation system 100. In addition, it should be noted that other information and/or data relevant to the operation of the present systems and methods (such as database 185) can also be stored on storage 190, as will be discussed in greater detail below.

Also preferably stored on storage 190 is database 185. As will be described in greater detail below, database 185 contains and/or maintains various data items and elements that are utilized throughout the various operations of purchasing advice solicitation system 100. The information stored in database 185 can include, but is not limited to, reviewer identifiers that are unique to each registered reviewer (i.e., reviewer 115), consumer identifiers that are unique to each registered consumer (i.e., consumer 125), personal information for each consumer, banking information for registered reviewers and consumers, and a history of transactions for the reviewers, as will be described in greater detail herein. It should be noted that although database 185 is depicted as being configured locally to system server 105, in certain implementations database 185 and/or various of the data elements stored therein can be located remotely (such as on a remote device or server—not shown) and connected to system server 105 through a network in a manner known to those of ordinary skill in the art.

Communication interface 150 is also operatively connected to the processor 110 and can be any interface that enables communication between the system server 105 and external devices, machines and/or elements including consumer device 101 and reviewer device 102. Preferably, communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting system server 105 to other computing devices and/or communication networks such as private networks and the Internet. Such connections can include a wired connection or a wireless connection (e.g., using the 802.11 standard) though it should be understood that communication interface 150 can be practically any interface that enables communication to/from the system server 105.

At various points during the operation of purchasing advice solicitation system 100, system server 105 can communicate with one or more computing devices, such as those controlled and/or maintained by one or more consumers (i.e., consumer 125) and/or reviewer (i.e., reviewer 115), such as reviewer device 102, and consumer device 101, each of which will be described in greater detail herein. Such computing devices transmit and/or receive data to/from system server 105, thereby preferably initiating maintaining, and/or enhancing the operation of the purchasing advice solicitation system 100, as will be described in greater detail below.

It should be understood that the remote device 102 and consumer device 101 can be in direct communication with system server 105, indirect communication with system server 105, and/or can be communicatively coordinated with system server 105 through a computer network 160 such as the Internet.

It should be noted that while FIG. 1 depicts purchasing advice solicitation system 100 with respect to a reviewer device 102 and a consumer device 101, it should be understood that any number of reviewer devices and consumer devices can interact with the purchasing advice solicitation system 100 in the manner described herein. It should also be noted that while FIG. 1 depicts a purchasing advice solicitation system with respect to consumer 125 and reviewer 115, it should be understood that any number of consumers and reviewers can interact with the purchasing advice solicitation system in the manner described herein. It should be further understood that a substantial number of the operations described herein are initiated by and/or performed in relation to such computing devices. For example, as referenced above, such computing devices can execute applications and/or viewers which request and/or receive data from system server 105, substantially in the manner described in detail herein.

It should be further understood that while the various computing devices and machines referenced herein, including but not limited to, system server 105, reviewer device 102, and consumer device 101 are referred to herein as individual/single devices and/or machines, in certain implementations the referenced devices and machines, and their associated and/or accompanying operations, features, and/or functionalities can be arranged or otherwise employed across any number of devices and/or machines, such as over a network connection, as is known to those of skill in the art.

The operation of the purchasing advice solicitation system 100 and the various elements and components described above will be further appreciated with reference to the method for facilitating an alternative payment submission as described below, in conjunction with FIG. 3 and FIG. 4.

Figure 3:
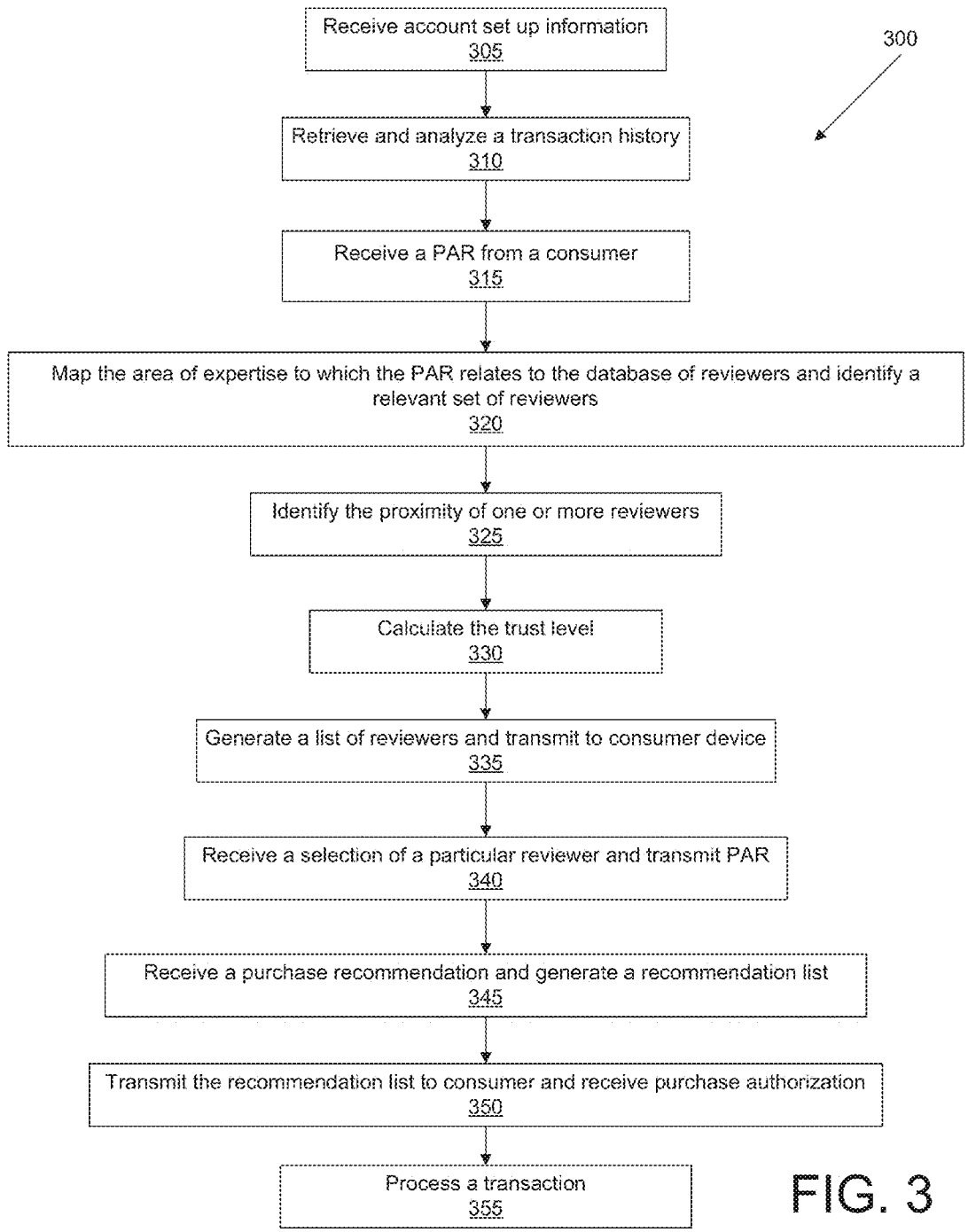
FIG. 3 is a flow diagram illustrating a routine for facilitating the solicitation of purchasing advice in accordance with at least one embodiment disclosed herein.

Turning now to FIG. 3, a flow diagram illustrates a routine 300 for facilitating the solicitation of purchasing advice in accordance with at least one embodiment disclosed herein. It should be appreciated that more or fewer operations can be performed than shown in the figures and described herein. These operations can also be performed in a different order than those described herein.

The process begins at step 305, in which processor 110 executing one or more of software modules 130, including, preferably database module 170, configures system server 105 to receive account information from reviewers wishing to be registered and make use of the services provided by the purchasing advice solicitation system. A reviewer 115 using a reviewer device 102 can connect to system server 105 and can provide information specific to the reviewer including name, social network information (i.e., log-in information to various social network services such as Facebook® by Facebook, Inc. or Linkedin® by Linkedin Corp.) and payment transaction information regarding credit cards, debit cards, prepaid cards or gift cards, or any combination of the foregoing that have been used by the reviewer. The reviewer 115 can also provide information relating to the reviewer's areas of expertise and also adjust preferences. The preferences can include, but are not limited to, specifying to which types of PARs the reviewer would like to respond, through which specific social groups within reviewer's greater social network that they wish to receive PARs. In addition, reviewer can also require authorization before the system retrieves data concerning the reviewer's transaction history. Thus, it should be apparent that in the system described herein, a reviewer opts in, thereby consenting to the use of their transaction data as well as any other information he or she provides.

System server 105 can generate a reviewer identifier that is unique to the reviewer 115 and create a reviewer account by associating the reviewer identifier with all the information provided by the reviewer 115 during the registration processes and store this information within the database 185.

Then, at step 310, processor 110 executing one or more of software modules 130, including, preferably reviewer analysis module 172, configures system server 105 to retrieve and analyze a transaction history for one or more of the reviewers. More particularly, the system server 105 can use the payment transaction information supplied by the reviewer and stored in the database to retrieve the payment transaction history of the reviewer from the payment card network, such as MasterCard International Incorporated. System server 105 can then analyze the transaction history to identify purchases that relate to one or more areas of expertise and determine the reviewer's level of expertise in that area. To do so, the system server can apply an algorithm that is a function of the frequency of purchases, the breadth of purchases, the category of goods purchased and the amount spent at merchants who offer products/services that are related to a particular type of goods. For example, if reviewer frequently makes purchases from camera stores amounting to a significant amount of money and the purchases include digital SLR cameras, video cameras, and lenses, the system server applying the algorithm can determine that the reviewer has expertise in the areas of photography. The system can also identify with more particularity any number of areas of expertise in narrower sub-categories (e.g., cameras, digital SLR cameras, video-cameras and lenses).

Then, at step 315, processor 110 executing one or more of software modules 130, including, preferably, consumer request module 174 and database module 170, configures system server 105 to receive a PAR from a consumer. The consumer 125 using a consumer device 101 can connect to system server 105 and can provide information about the consumer including a name and social network information (i.e., log-in information to various social network services) and details of the prospective purchase about which the consumer is requesting advice. These details can include a broad area of expertise to which the request pertains (e.g., photography) and more specific information, such as the particular category of goods they want to purchase (e.g., a camera), requirements for the goods (e.g., point-and-shoot, compact, easy to use, lightweight), intended use of the goods (e.g., indoor-outdoor, family events) and the desired purchase price (e.g., $200-$300). System server 105 can generate a consumer identifier that is unique to the consumer and create a consumer account by associating the consumer identifier with all the information provided by the consumer 115 in the PAR and store this information within the database 185.

Consumer can also adjust preferences, including through which specific social groups within consumer's greater social network they wish to submit the PAR. The consumer can also elect to have the system automatically purchase the goods or services ultimately recommended by the reviewer and can supply payment card or bank account information and shipping information, as further described herein. The consumer can also define the maximum amount of money he or she wishes to spend, as well as the amount of control to retain over what is ultimately purchased. For example, the consumer may wish to have no involvement beyond submitting the PAR and be willing to let the reviewer and/or system decide which product to purchase. Alternatively, the consumer may wish to be presented with purchase options and then authorize the purchase of a particular recommended product.

Then, at step 320, processor 110 executing one or more of software modules 130, including, preferably, request processing module 178, configures system server 105 to map the area of expertise to which the PAR relates to the database of reviewers and identify a relevant set of reviewers. More particularly, the system server can identify the relevant set by cross-referencing the PAR details with the area(s) of expertise of each of the one or more reviewers as determined in step 310. Furthermore, the system server can rank at least the relevant set of reviewers by a relevance factor. The relevance factor can be computed for each reviewer in the relevant set by applying an algorithm that is a function of the reviewer's areas of expertise as compared to the prospective purchase details in the PAR. As mentioned above, purchase details can include a broad area of expertise and more specific information, such as the particular category of goods to be purchased. For example, in regards to the exemplary PAR described in relation to step 315, the system server can query the database 185 to identify the reviewers with expertise in the broad area (i.e., photography) and also identify reviewers with expertise in the more specific areas (i.e., the type of goods: cameras). Accordingly, reviewers that have expertise in only the broader areas can be determined to be less relevant than those reviewers that have expertise in more specific areas.

Then, at step 325, processor 110 executing one or more of software modules 130, including, preferably, request processing module 178, configures system server 105 to identify the proximity of one or more reviewers in at least the relevant set determined in step 320, to the social network of the consumer. The system server 105 can use social network information submitted by the consumer at step 315 to retrieve the identity of individuals that are part of the consumer's social network and construct a social graph of the network (i.e., a sociogram of the consumer's friends, and friends of friends, etc.). The system server can cross-reference the consumer's social network with the social network information of each reviewer in the relevant set to identify one or more reviewers who are in the consumer's social network. The proximity of a particular reviewer to the consumer is defined as the number of hops in the social graph between the consumer and the particular reviewer.

It should be understood that steps 320 and 325 are not required to be performed in this particular order and can be performed in reverse order or concurrently. Furthermore, it should be understood that steps 320 and 325 can be broken into sub-routines that can be performed in any suitable order. For example, when processing the PAR, the system server can first identify all reviewers that are within two hops of the consumer. From this subset of reviewers, the system can identify which reviewers have an area of expertise that is relevant to the PAR. If an insufficient number of relevant reviewers are identified, the system server can broaden the search to identify all reviewers, say, within four hops of the consumer.

Then at step 330, processor 110 executing one or more of software modules 130, including, preferably, request processing module 178, configures system server 105 to calculate the trust level of the one or more reviewers identified by steps 320 and 325. System server can calculate the trust level for each identified reviewer by applying an algorithm that is a function of the number of social hops between the consumer and the reviewer and adjusts the trust level in inverse proportion to the number of hops from the consumer. Accordingly, a reviewer that is one hop removed from the consumer (i.e., an immediate "friend") can be designated as a more trusted source of information than one who is two hops removed (i.e., a "friend of a friend"). In addition the algorithm used to calculate the trust score can also be a function of the relevance factor of that reviewer and adjusts the trust level in direct proportion to the relevance factor. Accordingly, a reviewer with a higher relevance factor within one hop of the consumer can have a higher trust score than a reviewer with a lower relevance factor within one hop. The particular weighting of relevance factor and number of hops to calculate trust level can be varied as would be understood by persons of ordinary skill in the art.

Then, at step 335, processor 110 executing one or more software modules 130, including, preferably, reporting module 178, configures system server 105 to generate a list of reviewers that are ranked by trust level in step 330 and transmit the list to consumer device 101. Consumer 125 using consumer device 101 can review the list which can include, but is not limited to, the names of each of the suitable reviewers, details about each reviewer's areas of expertise, and information about the social connection between the reviewer and the consumer. Consumer 125 can also be presented with virtual buttons displayed on consumer device 101 to select a particular reviewer to respond to the PAR.

Figure 4:
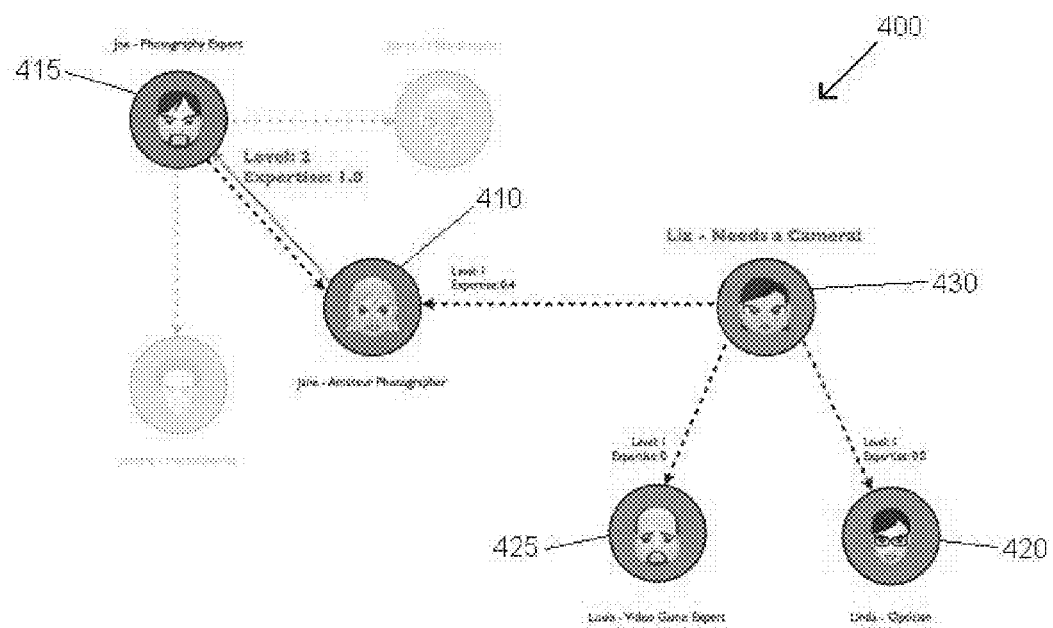
FIG. 4 depicts a screenshot of an exemplary social map in accordance with at least one embodiment disclosed herein.

Turning briefly to FIG. 4 which depicts an exemplary social map 400 generated according to certain aspects of purchasing advice solicitation system 100. Social map 400 depicts the social network of consumer 430 (Liz) up to three hops removed so that the map includes Liz's friends and friends of friends and their friends. By way of example, Liz has submitted a PAR to the system 100 requesting advice on the purchase of a camera and has specified that the field of goods is photography and the category of goods is cameras.

The social map 400 generated by system includes a number of reviewers 410, 415, 420 and 425 who have registered with the system and thereby consented to use of their transaction information and other data they have provided. In this example, the system has identified reviewer 410 (Jane) as an amateur in photography, reviewer 415 (Joe) as an expert in photography, reviewer 420 (Linda) as an expert in the field of optometry and reviewer 425 (Louis) as an expert in video games. The proximity of Jane, Louis and Linda is determined to be one hop because they are direct friends of Liz. The proximity of Joe is determined to be two hops because he is indirect friends with Liz through Linda. Of the four reviewers identified, the system has also determined each reviewer's relevance factor according to the relevance of their area of expertise to the PAR. Because Liz has requested advice relating to photography, more specifically cameras, Louis, the video game expert and Linda the optician are given low relevance scores. Jane, the amateur photographer, has directly relevant expertise but as an amateur photographer is given a moderate relevance factor. Joe, the photography expert, also has directly relevant expertise and as an expert in the field is given a high relevance factor. Based on each reviewer's proximity and relevance factor, the system can calculate the trust level of each reviewer and provide the ranked list to Liz.

Returning to the exemplary routine 300 depicted in FIG. 3, at step 340, processor 110 executing one or more software modules 130, including, preferably, advice solicitation module 180, configures system server 105 to receive from consumer 125 using consumer device 101 a selection of the particular reviewer and forward the PAR to the particular reviewer. In addition, system server 105 can provide reviewer and consumer the option to open up a communication session whereby the particular reviewer and consumer can discuss the PAR or otherwise communicate electronically via the system 100, e-mail, or a mutual social network provider.

Then at step 345, processor 110 executing one or more software modules 130, including, preferably, advice solicitation module 180, configures system server 105 to receive from reviewer 115 using reviewer device 102 a purchase recommendation responsive to the PAR and generate or create a recommendation list from the reviewer's purchase recommendations. The purchase recommendation can include one or more recommended goods/services to purchase, rankings of the options and comments. The recommendation can also include one or more online and/or brick and mortar merchants that sell the recommended goods/services. In generating a recommendation list to be provided to the consumer, system server 105 can also identify additional online and/or brick/mortar merchants who sell the recommended goods and provided information about the identified merchants. System server 105 can also rank the identified merchants by a variety of factors including sales volume, price of the goods, shipping times, stock levels and reliability.

Then, at step 350, processor 110 executing one or more software modules 130, including, preferably, advice solicitation module 180, configures system server 105 to transmit the recommendation list to the consumer 125 using consumer device 101. Consumer 125 can also be presented with virtual buttons displayed on remote consumer device 101 whereby the consumer can select the product/services they wish to purchase as well as which merchant they wish to purchase from and authorize the system to complete the purchase. Consumer can also be provided with the option to submit a follow-up PAR relating to the options presented in the event that the consumer is dissatisfied with the results or has additional requirements for the particular reviewer to consider. In the event that consumer has a follow-up PAR, the system can repeat steps 340-350. In the event that consumer did not provide payment card information and shipping information as discussed in step 315, consumer can be provided with the option to provide this information and have the system 100 automatically complete the purchase as discussed herein.

Then, at step 355, processor 110 executing one or more software modules 130, including, preferably, transaction processing module 182, configures system server 105 to process a transaction for the selected goods/services with the selected merchant In the event that the consumer does not select a particular merchant, the processor executing transaction processing module 182 configures the system server to automatically choose a merchant according to one or more of the merchant ranking factors described in step 345. In the event that consumer has opted to have minimal control over the ultimate purchasing decision, as discussed in step 315, system server 105 can process a transaction for the good based on the reviewer's recommendation.

Upon transmitting the recommendation list to the consumer or completion of a purchase of goods pursuant to the PAR, the consumer can be prompted to provide feedback regarding the particular reviewer's performance. Feedback can be provided in the form of a ranking system such as a five-star system wherein the quality of the service is proportional to the number of stars awarded. This feedback can be used by system server 105 to more accurately calculate the trust level of reviewers.

At this juncture, it should be noted that although much of the foregoing description has been directed to systems and methods for facilitating payment transactions, the systems and methods disclosed herein can be similarly deployed and/or implemented in scenarios, situations, and settings far beyond the referenced scenarios. It can be readily appreciated that the purchasing advice solicitation system 100 can be effectively employed in practically any scenario in which a transaction is being made between one or more parties, whether in person or via electronic methods.

It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a computer implemented method, computer system, and computer program product for facilitating payment transactions. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A computer-implemented method for providing consumers with expert advice in an area of expertise from a reviewer having a direct or indirect social connection with the consumers as identified from a social network, comprising:

receiving, by a processor configured by executing code therein, a purchase advice request (PAR) from a particular consumer over a computer network, the PAR relating to the area of expertise;

for one or more reviewers in a database of reviewers, analyzing a financial transaction history concerning purchases made by a particular reviewer relating to one or more areas of expertise to determine the particular reviewer's one or more areas of expertise;

comparing the area of expertise to which the PAR relates to the one or more reviewer's determined areas of expertise using a processor configured by code executing therein in order to identify a relevant set of reviewers having an area of expertise that is related to the PAR, identifying, using the configured processor, a proximity of one or more of the reviewers in at least the relevant set to the particular consumer within the social network by analyzing the particular consumer's social network to identify the reviewer therein, and calculating a number of hops within the social network from the consumer to the reviewer, wherein the number of hops represents how directly the one or more of the reviewers are connected to the particular consumer within the social network;

calculating with the configured processor a trust level for each of the reviewers in at least the relevant set according to the identified proximity to the particular consumer such that the trust level is inversely proportional to the number of hops in the social network from the consumer to the reviewer; and forwarding the PAR to a particular reviewer among the reviewers in accordance with the calculated trust level.

2. The method of claim 1, further comprising: ranking the reviewers by a relevance factor, including ranking at least the reviewers in the relevant set, wherein the relevance factor is computed using the configured processor by applying an algorithm that is a function of the reviewer's identified areas of expertise as compared to the prospective purchase details included in the PAR.

3. The method of claim 1, the step of analyzing the transaction history of each reviewer further comprises: retrieving the financial transaction history by the processor from a database; and determining a level of expertise in the one or more areas of expertise so determined.

4. The method of claim 3, further comprising identifying the relevant set of reviewers in regard to the respective levels of expertise so determined.

5. The method of claim 1, further comprising: presenting the trust level to the particular consumer and receiving a selection from the particular consumer of the particular reviewer prior to the forwarding step.

6. The method of claim 1, further comprising: obtaining a permission from each reviewer to retrieve data concerning the transaction history.

7. The method of claim 1, the step of determining the proximity comprising: generating a social graph including the particular consumer's social network; analyzing the social graph to identify the one or more of the reviewers in the social graph; and calculating a number of hops in the social graph from the consumer to each of the one or more of the reviewers.

8. The method of claim 1, further comprising determining the proximity according to a set of social groups selected by each reviewer, the particular consumer, or both.

9. The method of claim 1, the transaction history including information relating to the use of a credit card, a debit card, a prepaid card, a gift card, or a combination of the foregoing.

10. A computer implemented method for facilitating the solicitation of purchasing advice, the method comprising:

receiving, using code executing in a processor, account information from one or more reviewers over a computer network, the account information including transaction history information and social network information and storing the account information in a database;

for each of the one or more reviewers, retrieving, using code executing in the processor, a financial transaction history concerning purchases made by a particular reviewer relating to one or more areas of expertise and analyzing the transaction history to identify the particular reviewer's one or more areas of expertise;

receiving, using code executing in the processor, a purchase advice request (PAR) from a particular consumer over a computer network, the PAR including social network information and prospective purchase details relating to an area of expertise;

comparing the area of expertise to which the PAR relates to one or more reviewer's respective areas of expertise using a processor configured by code executing therein in order to identify a relevant set of reviewers having an area of expertise that is relevant to the area of expertise to which the PAR relates;

identifying, using code executing in the processor, the particular consumer's social network;

identifying, using code executing in the processor, a proximity of one or more of the reviewers in at least the relevant set to the particular consumer within the social network;

ranking the reviewers in at least the relevant set by a relevance factor, wherein the relevance factor is computed, using code executing in the processor, by applying an algorithm that is a function of the reviewer's identified areas of expertise as compared to the prospective purchase details included in the PAR;

calculating, using code executing in the processor, a trust level for each of the one or more reviewers in at least the relevant set by using the identified proximity to the particular consumer and the relevance factor; and providing the particular consumer, using code executing in the processor, a ranking of the one or more reviewers in at least the relevant set based on the trust level.

11. The method of claim 10, wherein the step of analyzing the transaction history further comprises applying an algorithm that is a function of frequency of purchases, breadth of purchases, category of goods purchased and amount spent at merchants associated with the category of goods.

12. The method of claim 10, further comprising: receiving payment information from the particular consumer.

13. The method of claim 10, further comprising: receiving a transaction authorization from the particular consumer.

14. The method of claim 10, further comprising: receiving a feedback rating from the particular consumer.

15. The method of claim 10, wherein the step of calculating the relevance factor further comprises applying an algorithm that is a function of a feedback rating for each of the one or more reviewers in at least the relevant set.

16. The method of claim 10, further comprising the steps of: receiving a selection from the consumer of a particular reviewer; and transmitting the PAR to the particular reviewer.

17. The method of claim 10, further comprising the steps of: receiving a purchase recommendation from the particular reviewer; receiving a transaction authorization; and completing the transaction.

18. A system for facilitating the solicitation of purchasing advice comprising:

one or more processors configured to interact with a network communication interface and a computer-readable storage medium and execute one or more software modules stored on the storage medium including, a database module that, when executed by the processor, configures the processor to receive account information from one or more reviewers over a computer network via the network communication interface and store the account information in a database, the account information including social network information and transaction history information;

a reviewer analysis module that, when executed by the processor, configures the processor to, for each of the one or more reviewers, retrieve from a database in communication with the processor a transaction history of purchases made by a particular reviewer and analyze the transaction history to determine an area of expertise for the particular reviewer;

a consumer request module that, when executed by the processor, configures the processor to receive a purchase advice request (PAR) from a consumer over a network via the network communication interface, the PAR including social network information and an area of expertise to which the PAR relates;

a request processing module that, when executed by the processor, configures the processor to identify a relevant set of reviewers by comparing the area of expertise to which the PAR relates to the area of expertise of the one or more reviewers; identify a proximity of the one or more of the reviewers in at least the relevant set of to the consumer by analyzing the particular consumer's social network to identify the one or more of the reviewers in at least the relevant set, and calculating a number of hops in the social network from the consumer to the one or more reviewers in the relevant set; calculate the trust level for the one or more reviewers in at least the relevant set according to the identified proximity, wherein the trust level for a particular reviewer is inversely proportional to the number of hops from the consumer to the particular reviewer; and a reporting module that, when executed by the processor, configures the processor, via the network communication interface, to provide over a network to the consumer a ranking of the one or more reviewers in at least the relevant set based on the trust level.

19. The system of claim 18, wherein the request processing module is configured to calculate a relevance factor for the one or more of the reviewers in at least the relevant set.

20. The system of claim 19, wherein the request processing module is configured to calculate trust level according to the identified proximity and the relevance factor.

21. The system of claim 18, wherein the consumer request module is configured to receive payment information from the consumer.

22. The system of claim 18, the PAR including a transaction authorization.

23. The system of claim 18, further comprising: an advice solicitation module configured to receive a selection of a particular reviewer from the consumer and transmit the PAR to the particular reviewer.

24. The system of claim 23, further comprising: a transaction processing module configured to receive a purchase recommendation from the particular reviewer; receive a transaction authorization; and complete a transaction.

* * * * *